Patented June 6, 1933

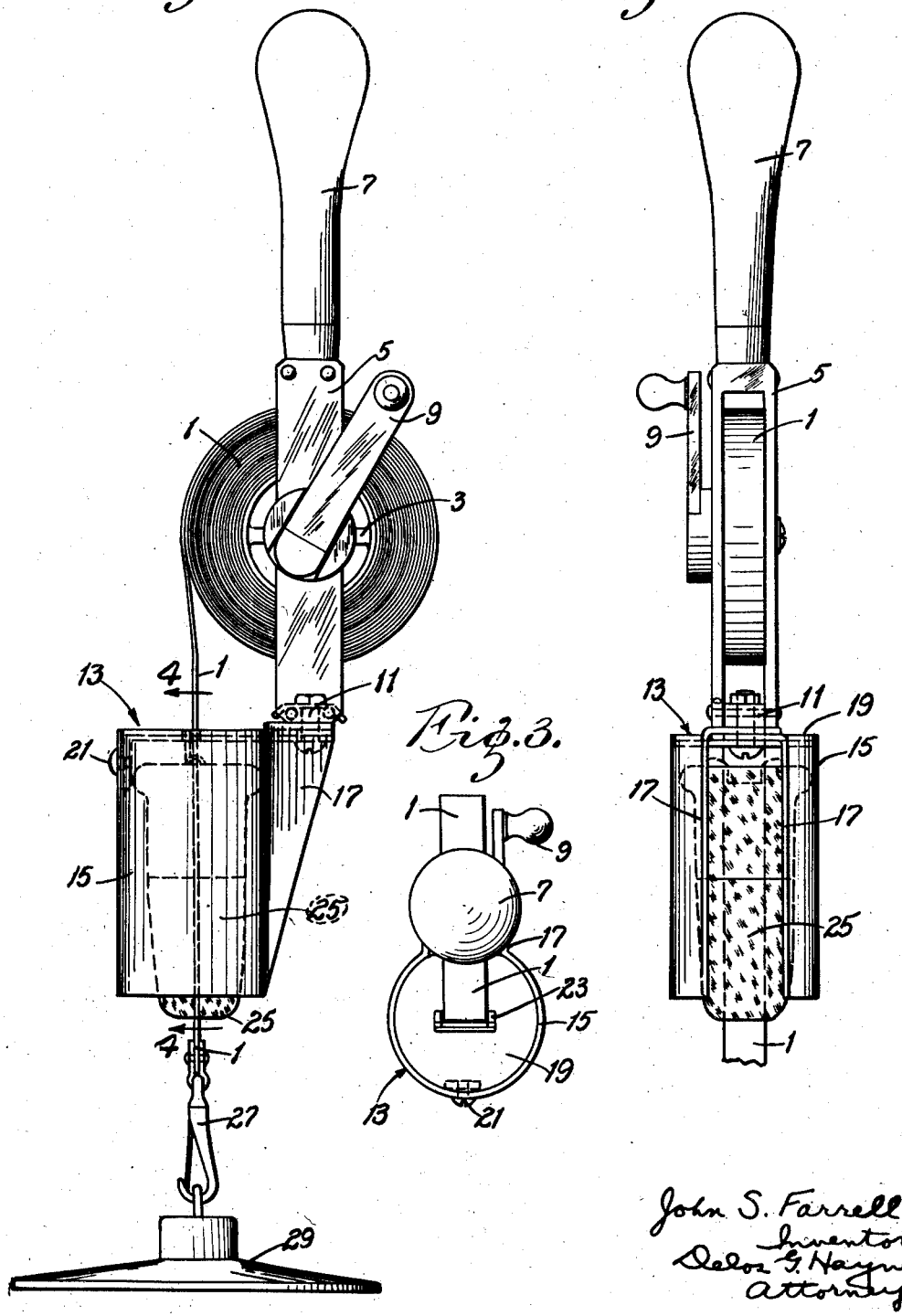

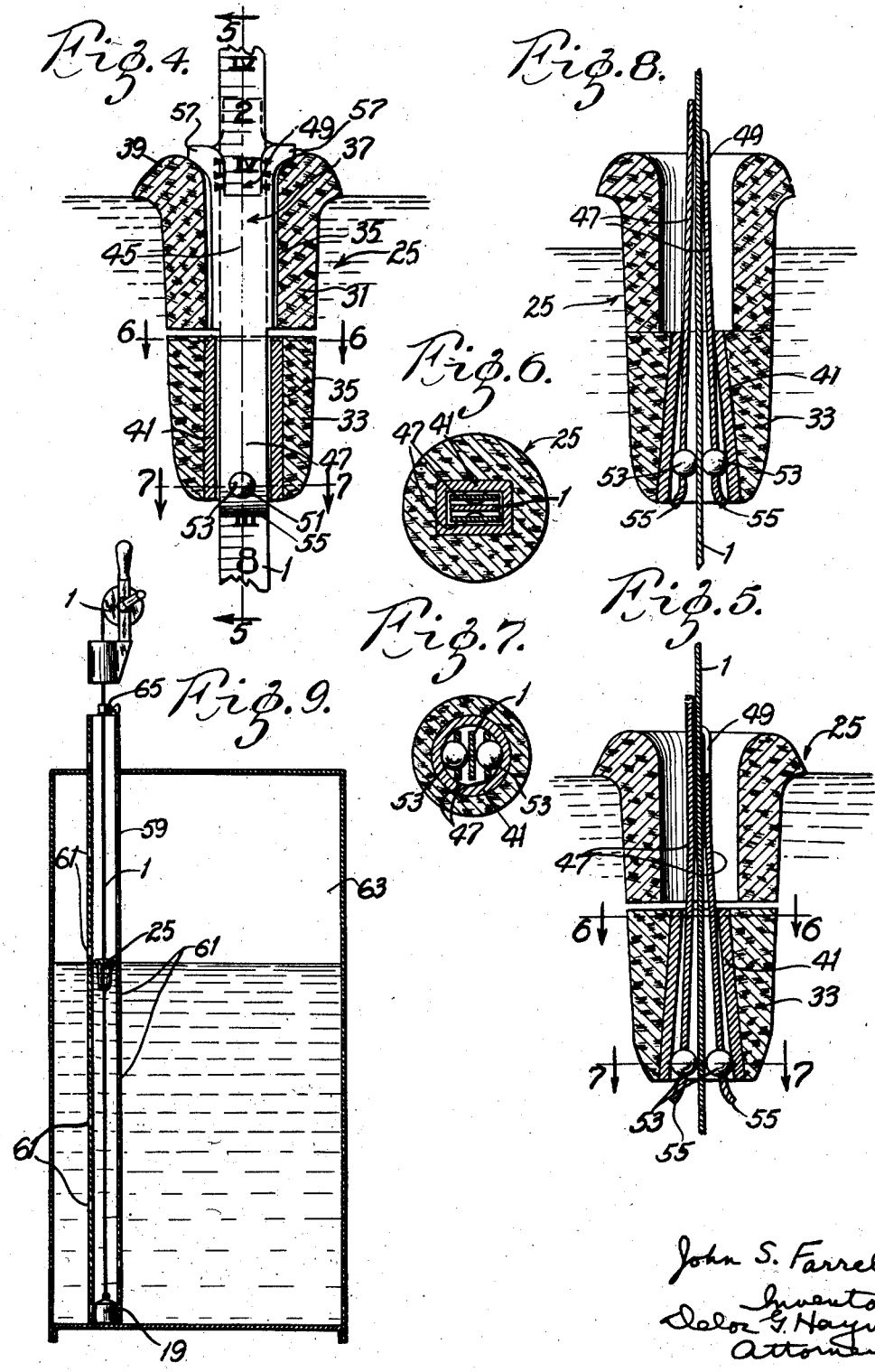

1,913,023

UNITED STATES PATENT OFFICE

JOHN S. FARRELL, OF ST. LOUIS, MISSOURI

DEPTH MEASURING DEVICE

Application filed February 20, 1930. Serial No. 429,913.

This invention relates to depth measuring devices, and with regard to certain more specific features, to depth measuring devices particularly adapted for use in connection with inaccessible liquid tanks and the like.

Among the several objects of the invention may be noted the provision of a depth measuring device of the flotation class which is simple in construction and fool-proof in operation; a depth measuring device which includes a calibrated reference tape or the like and a float sliding thereon, said float having clutching means therein enabling it to be positively held to said tape or rod when a liquid level is measured; a depth measuring device of the class described which reads accurately to within a fraction of an inch the depth of the liquid being measured; a depth measuring device of the class described which is simple and which is adapted for use with tanks containing large numbers of coils or like interferring means; and a depth measuring device of the class described which is simple and economical to manufacture. Other objects will be in part obvious and in part pointed out hereinafter.

The invention accordingly comprises the elements and combinations of elements, features of construction, and arrangement of parts which will be exemplified in the structure hereinafter described, and the scope of the application of which will be indicated in the following claims.

In the accompanying drawings, in which is illustrated one of various possible embodiments of the invention, Fig. 1 is a side elevation of the depth measuring device;

Fig. 2 is a rear elevation;

Fig. 3 is a top plan view;

Fig. 4 is a vertical section of a float, taken substantially along line 4—4 of Fig. 1;

Fig. 5 is a vertical section of the float taken substantially along line 5—5 of Fig. 4, showing a clutching means in released position;

Fig. 6 is a cross section taken substantially along lines 6—6 of Figs. 4 and 5;

Fig. 7 is a cross section taken substantially along lines 7—7 of Figs. 4 and 5;

Fig. 8 is a vertical section similar to Fig. 5 but showing the clutching means in engaged position; and, Fig. 9 is a diagrammatic view showing an application of the depth measuring device of Fig. 1.

Similar reference characters indicate corresponding parts throughout the several views of the drawings.

Calibrated, weighted tapes, rods and the like, have been used heretofore for measuring the depth of liquids by lowering said tape or rod into the liquid and then reading the depth by means of the wet mark on the tape or rod. This method is subject to disadvantages in cases where the liquid happens to be volatile, so that it evaporates quickly and renders accurate reading difficult. The present invention provides a method of using calibrated tapes, rods, and the like for measuring volatile liquid depths without being dependent upon a wet mark.

Referring more particularly to Fig. 1, there is illustrated at numeral 1 a calibrated tape, preferably made of steel or the like, which is wound on a reel 3 in a reel holder 5. The reel holder 5 is provided with a handle 7 and a crank 9 for winding and unwinding the tape 1. It is to be understood that the particular reel holder 5 is illustrated herein by way of example only, and may comprise other types of reel holders. It is likewise to be understood that the tape 1 is exemplary of calibrated members, and that it can be substituted by a rod or other rigid member, in which event no reel or reel holder is required.

Bolted to the lower portion of the reel holder 5 by means of a machine screw 11 is a cover portion 13. The cover portion 13 is preferably made from sheet metal such as sheet aluminum, and comprises a cylindrical portion 15 and brace portions 17. The axis of the cylindrical portion 15 is preferably located directly beneath the reel 3 with the tape 1 wound thereon (see Fig. 3). The cover portion 13 is provided with a lid 19, which is held to said cover portion 13 by means of a bolt 21, and which is provided with a centrally located slot 23.

The tape 1 passes through the slot 23, and through a float 25 to be described hereinafter, and has affixed at its outer end a hook 27. In operation, a weight 29 is preferably attached to the hook 27. The tape 1 is preferably calibrated to take account the lengths of the hook 27 and the weight 29, so that, in operation, a direct reading of depth is obtained.

The float 25 is illustrated more in detail in Figs. 4 to 8, where it will be seen that it comprises an upper portion 31 and a lower portion 33, through which portions 31 and 33 passes a central opening 35. A clutch 37 is mounted in the central opening 35.

The upper portion 31 is preferably provided with an upper annular bead or extending portion 39. Said upper portion 31 is preferably slightly tapered downwardly. The lower portion 33 is also preferably tapered. Both portions 31 and 33 preferably comprise cork or other like material adapted to float readily upon the surface of a liquid.

The central opening 35 in the lower float 33 is lined with a conical metal tube 41. The tube 41 is substantially circular at the bottom part of the float 33, and converges upwardly, and is pressed at the top to a rectangular form (see Figs. 6 and 7).

The clutching means 37, as illustrated in Figs. 4 to 8, comprises a doubled-over piece of thin metal 45, with depending legs 47. The upper portion of the spring metal 45 is arranged to flare outwardly as shown in Fig. 4, to engage the flange 39 of the upper float 31. The upper portion of said piece 45 is also provided with an opening or depression 49, the lower edge of which is flat, and which engages the tape 1 to establish a reference point for making readings as described hereinafter. Other reference marks may be applied to the edges of the depression 49, for use as pointed out hereinafter.

The lower parts of the legs 47 are provided with circular openings 51 for the accommodation of steel balls or the like 53. The bottom extremities of the legs 47 are turned outwardly as at numerals 55.

Figs. 4 and 5 illustrate the float 25 in non-clutching position in a body of liquid. The upper float 31 is buoyant enough to support the clutching means 37, this being done by means of shoulders 57. The lower float 33, on the contrary, exhibits a slight tendency to sink, on account of the weight of the tube 41. It is to be noted that the presence of the lower float 33 serves to reduce the tendency of the tube 41 to sink, but does not support it entirely. As a result of this sinking tendency, the lower float 33 separates slightly from the upper float 31 and rests lightly on the balls 53, and in turn forces said balls to react slightly against the tape 1. This reaction is not sufficient, however, to restrict the downward motion of said tape 1, as in unreeling. This position of the clutching means is assumed automatically when the float 25 is in a body of liquid and the tape 1 is either stationary or moving downwardly (unreeling).

It is desirable that the lower edge of the notch 49, constitute a reference mark for the liquid most commonly measured, and that it be arranged to correspond to the level to which the float 25 sinks in its Fig. 5 position, to insure accuracy of readings. The other reference marks on the sides of notch 49 are located at appropriate levels for liquids of differing specific gravity less frequently measured.

When the motion of the tape 1 is changed to an upward or reeling motion, the balls 53, being already lightly in contact with the tape 1, are rolled upwardly in the conical tube 41, and the convergence of said tube 41 at once forces said balls together to effect a positive gripping of the tape 1. Simultaneously, the frictional engagement between the upwardly moving tape 1 and the legs 47 carries said legs 47, and the balls 53 therewith, upwardly, thereby enhancing the clamping action of said balls 53. This position of the clutching means 37 is illustrated in Fig. 5. It will be noted that engagement and clamping is immediate upon upward movement of the tape 1, and that downward pressure on the float 25 serves only to increase the clamping effect.

The operation of the depth measuring device is as follows:

The tape 1 is unreeled, through the cover portion 13, until the weight 29 reaches the bottom of the liquid being tested. At this time, the float 25 moves freely on the tape 1 and floats on the surface of the liquid being measured. The larger proportions of the float 25 being under the surface of the liquid, surface ripples, waves and the like are relatively ineffectual to affect the reading.

When the weight 29 has reached the bottom of the liquid being measured, the tape is rewound on the reel 3. With the first upward movement of the tape 1, the clutch 37 grips said tape 1, and the float 25 is securely affixed to said tape. When the float 25 is drawn up nearly to the cover portion 13, the depth of the liquid is read by means of the flat bottom of the notch 49 or other reference mark in the member 45. The float 25 is then drawn further into the cover portion 13. In order to wind up the remainder of the tape 1, the clutch 37 is released by manually pressing upwardly the bottom float 33, whereby said clutch 37 is returned to its Fig. 5 position, and the remainder of the tape 1 may be wound up for subsequent use. The member 47 at this time reacts against the lid 13.

In Fig. 9 is shown a preferred method for use with tanks which contain coils and the like which are apt to impede the progress of the descending weight 29 in the course of unwinding the tape 1. In this figure, a tube 59 with openings 61 therein is shown in position in a tank 63. The openings 61 permit liquid to reach the same level in the tube 59 as in the tank 63. The tape 1 with the float 25 and weight 19 thereon, is then lowered into the tube 59 as described hereinbefore. The tube 59 is preferably made of a predetermined length, and a marker 65 adjustably fixed on the tape 1 at the length of the tube 59. With this arrangement, no difficulty is experienced in determining when the weight 19 has reached the bottom of the liquid in the tank 63.

After the bottom has been reached by the weight 19, the tape 1 is rewound as described hereinbefore, and a reading made by means of the position of the float 25.

It is to be noted that downward pressure on the top of the float 31, such as is occasioned by said float rubbing against the inward walls of the tube 59 in the course of withdrawal, merely serves to fix said float 31 more securely to the tape 1, and will therefore not adversely affect the accuracy of the reading attained.

In view of the above, it will be seen that the several objects of the invention are achieved and other advantageous results attained.

As many changes could be made in carrying out the above constructions without departing from the scope of the invention, it is intended that all matter contained in the above description or shown in the accompanying drawings shall be interpreted as illustrative and not in a limiting sense.

I claim:

1. In combination, a calibrated tape, a reel therefor, a reel support, a weight on the end of said tape, and a float on said tape, said float having clutching means therein adapted to grip said tape, at any point along its length upon retraction of said tape.

2. In combination, a calibrated tape, a reel at one end of said tape, means for supporting said reel, a weight at the other end of said tape, and a float on said tape, said float being adapted to move freely on said tape throughout its length when said tape is being unwound from said reel but adapted to grip said tape at any point thereon when said tape is being wound on said reel.

3. In combination, a calibrated tape, means for winding up and unwinding said tape, a weight at one end of said tape, a float on said tape movable over the entire length of said tape, and a clutching means associated with said float adapted to secure said float to said tape at any point thereon when said tape is being wound up and to release said float from said tape when said tape is being unwound.

4. The depth measuring device comprising a substantially cylindrical float having a central opening therethrough, and a clutch mechanism in said opening, said clutch mechanism being actuated to operate by axially sliding in said opening.

5. The depth measuring device comprising a substantially cylindrical float having a central opening therein, a tube in the lower portion of said opening and a clutching means extending into said opening, said clutching means comprising a pair of legs joined together at the top thereof, and balls supported within said legs, said balls being actuated to clutching position by reaction against said tube.

6. The depth measuring device comprising a substantially cylindrical float having a central opening therein, a clutch extending into said opening comprising a pair of legs, and balls supported by said legs, said balls being adapted to be forced together by longitudinal movement of said clutch relative to said float.

7. The depth measuring device comprising a substantially cylindrical float having a central opening therein, a clutch extending into said opening comprising a pair of legs, balls supported by said legs and means for forcing said balls together upon longitudinal movement of said clutch relative to said float.

8. The depth measuring device comprising a substantially cylindrical float having a central opening therein, a clutch in said opening comprising a pair of legs, balls supported by said legs and means in said opening for forcing said balls together upon longitudinal movement of said clutch in said float, said means comprising an upwardly tapered tube in said opening.

9. The depth measuring device comprising a pair of substantially cylindrical floats having central openings therein, a clutch in said openings comprising a pair of legs, balls supported by said legs and means in said lower float for forcing said balls together into clamping position upon longitudinal movement of said clutch in said floats.

10. The depth measuring device comprising an upper and a lower substantially cylindrical float, each having central openings therein, a clutch in said openings comprising a pair of legs, balls supported by said legs and means in said opening in said lower float for forcing said balls together into clamping position upon separation of said upper and lower float, said means comprising a conical tube in said opening in said lower float, said tube having a circular cross section at its lower end and a restricted rectangular cross section at its upper end.

11. The depth measuring device comprising a float, a clutch in said float for accommodating a calibrated member, said clutch having a reference point thereon for reading said member, said reference point being located at substantially the level to which said float sinks in a liquid, said clutch being adapted to grip said member upon upward movement of said member and to release said member upon downward movement of said member.

12. In combination, a calibrated member and a float thereon, clutching means in said float adapted automatically to grip said member upon upward movement of said member and to release said member upon downward movement of said member, said clutch having means thereon for establishing relative positions of said float on said member.

13. In combination, a calibrated tape and a pair of floats thereon, clutching means in said floats adapted automatically to grip said tape upon upward movement of said tape and to release said tape upon downward movement of said tape, said clutch comprising a pair of legs, balls supported in said leg adapted to grip said tape and means associated with one of said floats for forcing said balls into gripping position on said tape, said clutch having means thereon adapted to indicate various relative positionings of said float on said tape.

14. A float for depth measuring devices comprising a body having a relatively low specific gravity, and clutching means associated with said body, said clutching means comprising a tube centrally mounted in said body, a pair of balls within said tube, means for retaining said balls within said tube, and means on said tube for forcing said balls together upon relative longitudinal motion between said balls and said tube in one direction.

In testimony whereof, I have signed my name to this specification this 17th day of February, 1930.

JOHN S. FARRELL.